United States Patent [19]
Broutin et al.

[11] Patent Number: 5,242,574
[45] Date of Patent: Sep. 7, 1993

[54] USE OF NICKEL-BASED ALLOYS IN A PROCESS FOR THE THERMAL CRACKING OF A PETROLEUM CHARGE AND REACTOR FOR PERFORMING THE PROCESS

[75] Inventors: Paul Broutin, Ecully; Christian Busson, Charbonniere; Antoine Montoya, Marcy l'Etoile; Jérôme Weill, Lyons, all of France

[73] Assignee: Institut Francais du Petrole, Rueil-Malmaison, France

[21] Appl. No.: 776,299

[22] PCT Filed: Jun. 5, 1990

[86] PCT No.: PCT/FR90/00392
§ 371 Date: Dec. 6, 1991
§ 102(e) Date: Dec. 6, 1991

[87] PCT Pub. No.: WO90/15119
PCT Pub. Date: Dec. 13, 1990

[30] Foreign Application Priority Data

Jun. 8, 1989 [FR] France .................. 89 07705

[51] Int. Cl.$^5$ .................. C10G 9/16; F28D 7/00
[52] U.S. Cl. .................. 208/48 R; 585/950; 422/200; 422/201; 208/106
[58] Field of Search .......... 208/48 R, 106; 420/445, 420/448; 422/200, 201; 585/950

[56] References Cited

U.S. PATENT DOCUMENTS

| | | | |
|---|---|---|---|
| 4,297,150 | 10/1981 | Foster et al. | 148/276 |
| 4,532,109 | 7/1985 | Maeda et al. | 422/240 |
| 4,536,455 | 8/1985 | Maeda et al. | 428/629 |
| 4,555,326 | 11/1985 | Reid | 208/48 R |
| 4,671,931 | 6/1987 | Herchenroeder et al. | 420/445 |
| 4,685,427 | 8/1987 | Tassen et al. | 122/511 |
| 4,762,681 | 8/1988 | Tassen et al. | 420/443 |
| 4,780,196 | 10/1988 | Alagy et al. | 208/130 |

Primary Examiner—Theodore Morris
Assistant Examiner—Walter D. Griffin
Attorney, Agent, or Firm—Millen, White, Zelano & Branigan

[57] ABSTRACT

A process and reactor are disclosed for the thermal cracking of a charge containing at least one hydrocarbon with at least one carbon atom, in which the charge is circulated in a metal reaction zone which includes a pyrolysis zone whose external wall is in thermal exchange relationship with a heating liquid. The reaction zone consists of an alloy containing, by weight, 66-82% nickel, 14-18% chromium, and 4-6% aluminum. This alloy, which has already been preoxidized, may be covered, at least in the reaction zone, with at least one layer formed by an oxide of at least one metal and/or at least one metal carbide and/or at least one metal nitride and/or at least one metal silicide. The invention finds application for vapor-phase cracking and dehydrogenation of hydrocarbon charges.

20 Claims, 1 Drawing Sheet

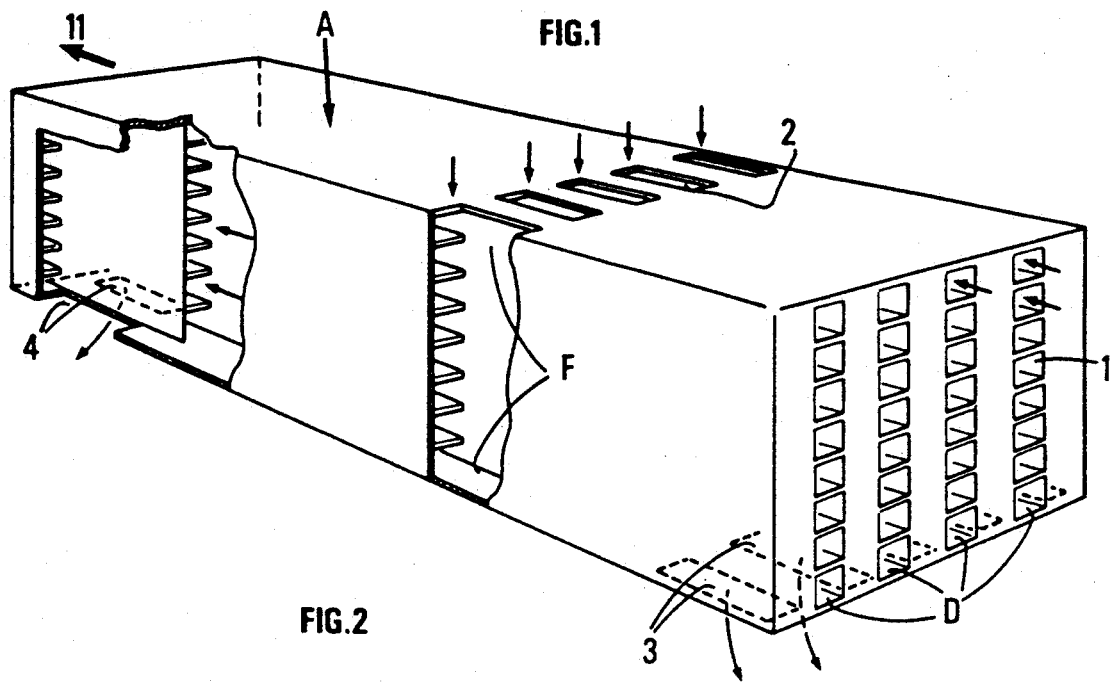
FIG.1
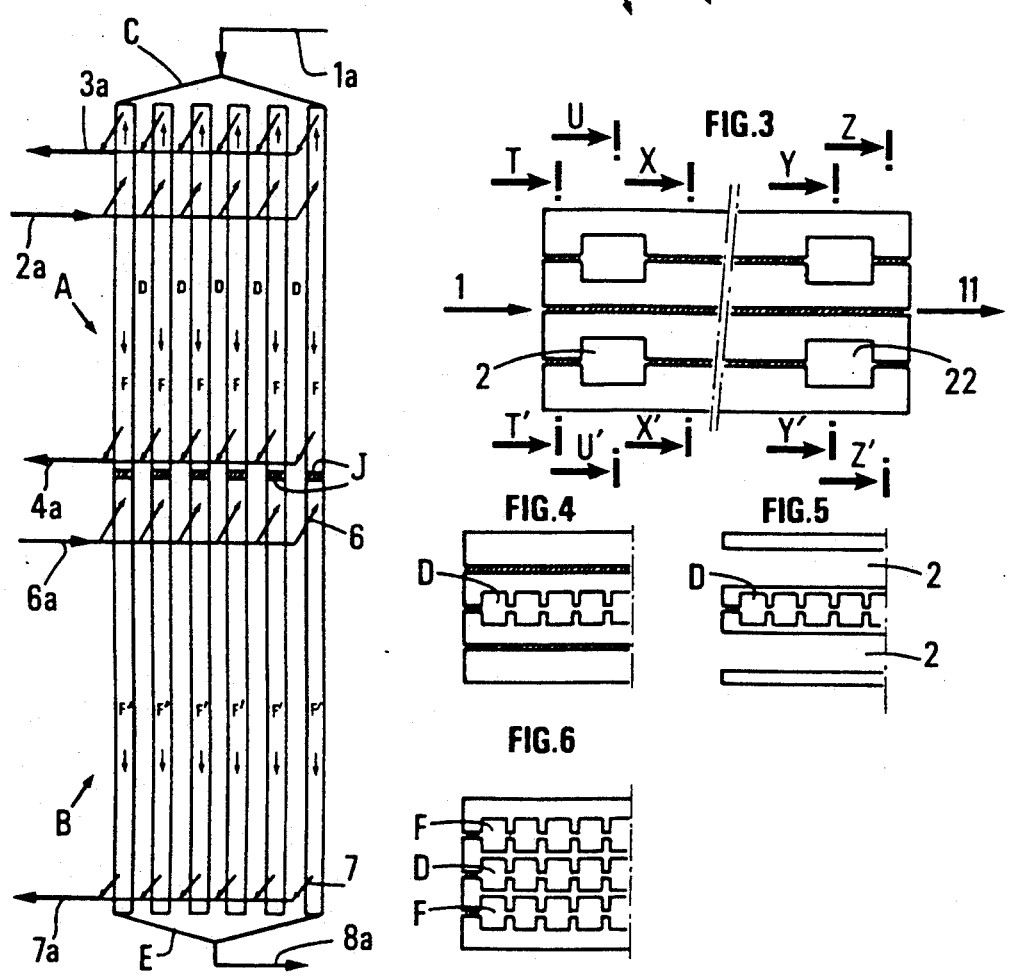

USE OF NICKEL-BASED ALLOYS IN A PROCESS FOR THE THERMAL CRACKING OF A PETROLEUM CHARGE AND REACTOR FOR PERFORMING THE PROCESS

BACKGROUND OF THE INVENTION

The invention relates to a process for the thermal cracking of a charge incorporating at least one hydrocarbon containing at least one carbon atom, in a cracking or pyrolysis zone made from a particular alloy.

The term thermal cracking is understood to mean the processes of steam cracking a charge of at least one hydrocarbon having two carbon atoms in the presence of steam, thermal dehydrogenation processes such as methane pyrolysis, or catalytic dehydrogenation such as the dehydrogenation of ethyl benzene into styrene or propane into propylene. All these processes involve reactions with a high heat flow, followed by a rapid quenching of the pyrolysis effluents.

Throughout the remainder of the description, in a purely illustrative manner, the invention will be described as a process for the steam cracking of at least one hydrocarbon containing at least two carbon atoms and intended to produce light olefins.

Its principle is based on the instability at high temperatures of paraffins and naphthenes when compared with olefins and aromatics. The main reactions are the breaking of a C—C bond by a homolytic breaking mechanism in order to lead to an olefin and a paraffin, as well as dehydrogenation. These two reactions are endothermic and are therefore aided by a temperature rise. They also lead to an increase in the number of molecules, so that they are aided by low partial pressures of the hydrocarbons to be treated. This is why the said pressure is reduced to the maximum by adding steam to the reaction medium.

The problems linked with the use of steam cracking reveal several main sources of difficulties inherent in the process operating at high temperature, such as the oxidation of the constituent materials of the reactor, the cementation of these materials, the formation of coke on the walls in contact with the hydrocarbons and the creep behavior of the reactor.

One of the solutions proposed in WO 8700546 is the use of ceramic materials able to withstand very high temperatures (e.g., 1200° C.), while obtaining a high heat flow. The latter factor can essentially be obtained by increasing the skin temperature of the tubular reactors and/or by decreasing the diameter of the tubes (which makes it possible to increase the s/v ratio, s being the exchange surface and v the reaction volume).

However, certain difficulties are encountered particularly with respect to sealing in contact with the ceramic forming the reactor and the metal supply and discharge tubes for the various fluids used in the process.

Advances made in metallurgy in connection with special alloys able to resist ever increasing temperatures (e.g. INCOLOY 800H, HK 40, HP40) have made it possible for steam cracking pyrolysis furnace designers to increase the operating temperatures of these tubular furnaces, the present limits being at approximately 1100° C.

It is also known that in order to be able to obtain a better behavior under high temperature conditions of nickel-based metallic alloys, their nickel content should be greatly increased. Moreover, it is also known that nickel and iron catalyze the coke formation reaction on the reactor walls in contact with the charge.

In order to carry out a steam cracking reaction, account must be taken of the fact that the outer wall of the reaction zone in contact with the high temperature heating fluid is exposed to an oxidizing atmosphere, whereas its inner wall in contact with the charge is exposed to an overall reducing atmosphere. It is therefore vital that the material chosen has a good thermal behavior under these two extreme media.

U.S. Pat. No. 4,671,931 describes an alloy having a high nickel content and which resists high temperature oxidation. However, this patent makes no reference to the use of this alloy under severe conditions due to the simultaneous exposure to an oxidizing atmosphere and to a reducing atmosphere of hydrocarbons such as those encountered in thermal cracking processes. It makes no reference to the problem of using metallic alloys which are affected by cementation or to the problem linked with the coke formation speed.

SUMMARY OF THE INVENTION

The present invention makes it possible to obviate the aforementioned disadvantages and to satisfy the indicated technical requirements.

One of the objectives is to be able to operate with an entirely metallic technology at maximum skin temperatures (of the wall in contact with the heating fumes) able to reach 1190° to 1250° C. without any significant risk for the material.

Thus, a process has been discovered which, in the case of steam cracking, makes it possible to increase the olefin selectivity, which increases with the mean temperature within the reactor.

In more general terms, the invention relates to a process for the thermal cracking of a charge containing at least one hydrocarbon having at least one carbon atom, in which said charge is made to flow under thermal cracking conditions in a metallic reaction zone, whose outer wall is in a heat exchange relationship with a heating fluid and at whose outlet cracking effluents are recovered. More specifically, said normally elongated and usually tubular reaction zone is essentially formed from an alloy containing, by weight, 66 to 82% nickel, 14 to 18% chromium and 4 to 6% aluminum. The composition of this alloy makes it possible to adequately withstand oxidation and creep at the above temperature levels while obtaining satisfactory refractory characteristics. Under these conditions, the reactor life is increased and there is also reduced sensitivity to fatique as a result of successive thermal cycles. On leaving the reaction zone, it is possible to optionally carry out a direct or indirect quenching of the cracking effluents.

The composition by weight of the alloy can advantageously be 66 to 81.999 and preferably 71 to 78.9% nickel, 14 to 18 and preferably 15 to 17% chromium, 4 to 6 and preferably 4.1 to 5.1% aluminum and 0.001 to 8 and preferably 1 to 6% iron. It is generally easier to produce such an iron containing alloy and in particular those containing 1 to 6% by weight iron.

According to another feature of the process according to the invention, the reaction zone generally comprises an inner wall in contact with the mixture, which can be preoxidized by contacting, at a temperature of 1050° to 1250° C. for 1 to 120 minutes, with a gas charge incorporating hydrogen and oxygen, said mixture having a dew point below −34° C. It is also possible and often preferable to preoxidize the inner and outer walls of the reaction zone.

This passivation through the formation of an alumina protective coating makes it possible to increase the resistance to oxidation and cementation. Thus, it has surprisingly been found that although the chromium content is below 20%, there was a selective formation of aluminum oxide, but small amounts of chromium and nickel oxide. The thus performed passivation also has an inhibiting effect on coke deposition, the hydrocarbon no longer being in direct contact with the nickel, which catalyzes the formation reactions thereof. It has also surprisingly been found that the coking rate with said alloy was usually 4 to 5 times lower than that observed in the case of conventional alloys such as INCOLOY 800 H and is comparable to that observed with silicon carbide.

According to another feature, the alloy can contain 0 to 0.25% carbon, 0 to 0.03% boron, 0 to 5% tungsten, 0 to 2.5% tantalum, 0 to 5% titanium, 0 to 0.5% hafnium, 0 to 0.25% zirconium, 0 to 0.2% rhenium, 0 to 12% cobalt, 0 to 1% manganese, 0 to 3% molybdenum, 0 to 1% silicon, 0 to 1.5% yttrium, 0 to 0.2% cadmium, 0 to 0.05% sulfur and 0 to 0.05% phosphorus. With or without the presence of these auxiliary metals, the maximum temperature of the outer wall of the reaction zone in contact with the heating fluid can reach 1190° to 1250° C. without any significant risk for the material.

As non-limitative examples of alloys usable in the invention reference can be made to that sold by the HAYNES Company under reference ALLOY 214 and that sold by the INCO-ALLOYS Company under reference ALLOY MA 6000.

The previously preoxidized walls of the reaction zone (and in particular the inner walls of said zone in contact with the hydrocarbon charge) can, in a special embodiment of the invention, be coated with at least one coating formed by an oxide of at least one metal and/or at least one metal carbide and/or at least one metal nitride and/or at least one metal silicide.

According to the invention, it is possible to use one or more coating materials belonging to the aforementioned material group in order to coat the surfaces of the apparatus and in particular those in contact with the hydrocarbon charge to be converted.

Among the materials usable for coating the walls of the reaction zone, reference can be made as typical examples with respect to metal oxides, to alumina ($Al_2O_3$), zirconia ($ZrO_2$), zirconia stabilized by yttrium oxide ($ZrO_2+Y_2O_3$), a mixture of cerium oxide and yttrium oxide ($CeO_2+Y_2O_3$), silica ($SiO_2$) and titanium dioxide. In the case of carbides, typical examples are silicon carbide (Sic), titanium carbide (TiC), zirconium carbide (ZrC) and boron carbide ($B_4C$). Typical non-limitative examples of nitrides are boron nitride (BN), titanium nitride (TiN) and zirconium nitride (ZrN). Among the silicides, reference is made to those of titanium, zirconium and niobium.

There is no particular limitation to the process according to which the surfaces of the apparatus are coated. Examples of processes usable for coating the walls of the reaction zone are:

impregnation by a mixture normally referred to as slip or slop containing elements chosen in order to form the coating and at least one binder;

chemical vapor deposition (CVD), e.g., using chlorides, fluorides, bromides, iodides, organometallic compounds, hydrides and carbonyl compounds with a reducing agent, such as, e.g., hydrogen;

plasma assisted chemical vapor deposition (PACVD) where an electric discharge is maintained in the gaseous phase;

deposition by spraying, e.g., flame or thermal spraying, or by plasma spraying consisting of injecting a powder into a plasma jet at a very high temperature. This process can be carried out in air, particularly in the case of oxides, or under an inert atmosphere, e.g., nitrogen, argon or helium, particularly in the case of metal carbides. Deposition can take place under atmospheric pressure or at a pressure below atmospheric pressure. Cold spraying can be used for projecting powders and is normally followed by a heat treatment for densifying and reducing the porosity of the coatings formed.

The coating normally has a thickness of at least approximately $2 \times 10^{-6}$ m and preferably at least approximately $5 \times 10^{-6}$ m. This coating normally has a thickness of approximately $2 \times 10^{-6}$ to approximately $10^{-3}$ m and preferably approximately $5 \times 10^{-6}$ to approximately $5 \times 10^{-4}$ m.

The coating can optionally contain a catalyst, e.g., it is possible to deposit by all known methods on the said coating a catalyst, e.g., a conventional dehydrogenation catalyst when it is wished to carry out this type of reaction. This is also possible when performing all thermocatalytic reactions and in particular cracking and/or steam cracking. It is also possible to firstly deposit a catalyst support on the coating, followed by the catalytically active phase or phases.

According to an advantageous embodiment, the pyrolysis reaction zone can be a so-called honeycomb structure and can have a plurality of substantially parallel, juxtaposed channels forming two groups, each channel of the first group being in a heat exchange relationship with at least one channel of the second group, the channels of the first group extending over the entire length of the reaction zone and being traversed by the reaction mixture, the channels of the second group being supplied by the heating fluid and extending at least partly along the reaction zone. The heating fluid supply of said heating zone takes place at one end of the reaction zone, the circulation of the heating fluid taking place, as a function of the charge to be cracked, in co-current or counter-current manner with respect to the gases constituted by the reaction mixture or the effluents (process gases). The association of these two circulation or flow types can also be envisaged. Preferably, in this embodiment, co-current circulation is used.

According to a particularly advantageous embodiment, the heating fluid supply can take place perpendicular to the channels through at least one opening made laterally with respect thereto and the fluid then flows axially, partly in co-current and partly in counter-current with respect to the process gas. Preferably, said supply is located at an intermediate point, whose distance at the start of the reaction zone (mixture introduction side) represents 5 to 95% and advantageously 20 to 40% of the length of said zone. According to this embodiment, the heating fluid is drawn off perpendicularly to the axis of the channels at one or two outlets positioned at the ends of the heating zone.

Thus, the maximum heat supply can be transmitted to the channels traversed by the mixture to be cracked at the location where endothermic cracking and dehydrogenation reactions take place. It is particularly advantageous for 5 to 80%, preferably 20 to 50% of the heating fluid to be drawn off at the head and the remainder, amounting to 100%, being drawn off at the tail.

The total number of rows of channels is not of a determinative nature in the process and is a function of the size of the reactor and the dimensions of a unitary channel. The cross-section of said unitary channel is advantageously between 9 and 900 mm$^2$ and is preferably between 25 and 100 mm$^2$. The channel can have a substantially square, rectangular or polygonal shape and its length can, e.g., be between 0.5 and 10 m.

These embodiments according to the invention offer numerous advantages compared with known cracking processes, namely:
  obtaining a substantially homogeneous wall temperature in the pyrolysis zone;
  possibility of operating at wall temperatures up to 1190° to 1250° C. and making it possible to increase the heat flow density and the reaction performance temperature, which is particularly important in the case of ethane cracking;
  increase of the ratio s/v, s being the exchange surface and v the reaction volume, so that in so-called "millisecond" technology said ratio is approximately 120 m$^{-1}$, whereas according to the invention it is possible to reach values at least equal to 200 m$^{-1}$ and even 1000 m$^{-1}$;
  low pressure drop within the reaction zone not exceeding 0.5 bar;
  maximum heat supply at the level of the reaction zone where the highly endothermic reactions take place leading to a very limited temperature gradient over the entire reaction zone.

The invention also relates to the reactor incorporating a metallic reaction zone having an outer wall in heat exchange relationship with an energy source appropriate for pyrolyzing a material containing hydrocarbons, said energy source, e.g., being a gaseous heating fluid. The reaction zone is made from an alloy generally incorporating by weight 66 to 82% nickel, 14 to 18% chromium and 4 to 6% aluminum. Through using this alloy, the service life of a reactor is significantly increased, in spite of the inner and outer faces of the reaction zone being exposed to respectively reducing and oxidizing atmospheres at very high temperatures. When used in steam cracking, there is also a reduced decoking frequency.

This reactor, or at least the reaction zone, can also be produced with the aid of a previously preoxidized alloy coated with at least one coating formed by an oxide at least one metal and/or at least one metal carbide and/or at least one metal nitride and/or at least one silicide of a metal.

The reactor can also be produced with the aid of a nickel-based alloy, followed by preoxidation and the deposition by known methods of a coating chosen from among those referred to hereinbefore.

The production of a honeycomb reactor from a metallic material can be carried out in numerous known ways. As non-limitative examples, a description is given hereinafter of two embodiments which are relatively easy to perform.

If the metallic material cannot be extruded, the honeycomb-type reactor can be prepared according to a first embodiment in the following way. Generally round tubes are drawn so as to give substantially square tubes with a mesh, e.g., between 4 and 10 mm and a partition thickness between 0.5 and 1 mm. These substantially square tubes are assembled by brazing following straigtening and bringing to the appropriate length. The square, assembled reactor is completed as follows. For example, using electroerosion or laser cutting, slots are made in the tubes of the odd rows, e.g., which serve to receive the heating fluid under the conditions of the inventive process. During a second brazing pass or operation, the ends of the channels receiving the heating fluid are plugged with the aid of plates made from the chosen material and having the size of the tube mesh. Onto the thus obtained bundle of tubes can optionally be brazed an outer envelope of the same material and with a thickness of 2 to 5 mm during a third brazing operation. The order of these three operations does not matter, which also applies with respect to the formation of the slots, which can be carried out before any brazing operation.

The honeycomb-type reactor can also be produced according to a second embodiment in the following way. Substantially square half-channels are produced by the machining of metal plates, which are then stacked and brazed. The heating fluid inlet and outlet slots, as well as the plugging of the fluid passage channel ends are carried out by adequate machining and assembly. Such an assembly will be described in detail hereinafter.

It is then possible to connect a conventional quenching exchanger as described in U.S. Pat. No. 3,910,347 to the pyrolysis reactor using known means, such as a metal clip or clamp.

According to another embodiment the quenching reactor part can be produced in the manner described hereinbefore, the channels of the odd rows plugged at the ends and laterally perforated in the vicinity of said ends being suitable for the flow of a quenching fluid. The two pyrolysis and quenching reactors are brazed. Finally, one end of the channels of the even rows is connected to a charge distributor and the other end to an effluent collecting tank, followed by the connection of the slots of the channels of the odd rows to a heating fluid distributor on the pyrolysis side and to a cooling fluid distributor on the quenching side and the slots of the opposite faces to a heating fluid collecting tank on the pyrolysis side and a cooling fluid collecting tank on the quenching side.

BRIEF DESCRIPTION OF THE DRAWINGS

The invention is described in greater detail hereinafter relative to non-limitative, illustrative embodiments with reference to the attached drawings. These embodiments are substantially identical to those described in patent application WO 8700546. In the different drawings, similar members are designated by the same reference numerals and letters.

FIG. 1 shows in the form of an exploded perspective view a honeycomb-type module representative of the pyrolysis zone having a rectangular cross-section and FIG. 2 shows another embodiment of the process according to the invention along a longitudinal section of the quenching exchanger-reactor assembly.

FIGS. 3 to 6 illustrate the construction of the reactor, considered in section in accordance with the second production embodiment described hereinbefore.

DETAILED DESCRIPTION OF THE PREFERRED EMBODIMENTS

The reactor is arranged so that it can function as follows:

a/ According to FIGS. 1 and 2 there is a pyrolysis zone A incorporating a plurality of channels constituting a first group of channels D and a second group of channels F, each channel D of the first group being positioned adjacent to at least one channel of the second group F. In the channels of the first group flows the reaction mixture extending along zone A and having an inlet 1 and an outlet 11 respectively at the start and finish of said zone. The second group of channels F defines a heating zone in which the reaction mixture flows through the channels of the first group and is heated by indirect heat exchange with a heating fluid flowing in the second group of channels. The channels of the second group F have an inlet 2, preferably at a distance from the start of the channels representing 5 to 95% of their total length. They also have a first outlet 3 at the start of said channel and a second outlet 4 at the end thereof. According to the process, it is also possible to have a single outlet either at 3 or 4.

b/ The channels of the second group F are supplied with a heating fluid from a line 2a and a distributor. A first part of the heating fluid is made to flow through part of the channels of the second group F extending from the inlet 2 to the first outlet 3. A second part of the heating fluid is made to flow through a part of the channels F extending from the inlet 2 to the second outlet 4. The heating fluid is recovered by means of a collecting tank along the outlet lines 3a and 4a respectively corresponding to the outlets 3 and 4.

c/ From a line 1a and a distributor C, the reaction mixture is made to flow through the channels of the first group D from the inlet 1 of one of them up to their outlet 11, the mixture firstly being subject to thermal cracking conditions within part of the channels of the first group adjacent to those of the second group and then to preferably indirect quenching conditions in a conventional quenching exchanger, which is not shown in FIG. 1.

d/ A steam cracking effluent is recovered at the outlet of the channels D of the first group.

According to another embodiment illustrated by FIGS. 1 and 2, the reaction zone comprises two zones A and B in continuous form, where the channels of the second group can be subdivided into a first section F and a second section F', said two sections being successive, non-communicating sections separated by an intermediate partition J, the first section being the heating or pyrolysis zone A, the second section defining a quenching zone B contiguous to the zone A in which the thermally cracked reaction mixture flowing in the channels D of the first group is cooled by indirect exchange with a cooling fluid flowing through the second section F' of the channels of the second group. The first section F has an inlet 2 and either a first outlet 3 at the start thereof, or a second outlet 4 in the vicinity of the intermediate partition J, or both the first and the second outlets 3 and 4, whilst the second section F' has an inlet 6 in the vicinity of the intermediate partition and an outlet 7 at the end of the second section. The cooling fluid is made to flow from a line 6a through the channels of the second section F' from the inlet of said channel 6 to their outlet 7. The cooling fluid is recovered by means of a collecting tank along the line 7a. After thermally cracking the reaction mixture in a part of the channels D of the first group adjacent to the first section F of the channels of the second group, the pyrolyzed mixture is then subject to indirect quenching conditions in a part of the channels of the second group adjacent to the second section F' of the channels of the second group and the effluents are recovered at the outlet of the channels of the first group by means of a collecting tank E and an outlet line 8a.

FIG. 3 shows in a view from the outside the assembly of four plates making it possible to produce a reactor having a row of channels D, in which the reaction mixture flows in accordance with the directions 1 to 11, interposed between two rows of channels F in which flows the heating fluid, which enters by the openings 2 and leaves by the openings 22 having a substantially square cross-section.

FIGS. 4, 5 and 6 are sectional views respectively in accordance with axes TT', UU' and XX'. The section along the not shown axis YY' leads to the obtaining of the same diagram as that shown in FIG. 5, the openings 2 then being the openings 22. The section along the not shown axis ZZ' is identical to that shown in FIG. 4. In FIGS. 3 to 6 the brazed surfaces are hatched.

The following example illustrates the invention. Naphtha steam cracking tests were carried out in the presence of steam at a temperature given in table 1 on a pilot installation successively equipped with five tubes of the same size, but made from different materials and heated by combustion fumes. On the pilot installation quenching takes place at 500° C. in an indirect manner on an inline TLX-type exchanger.

Tube A is made from INCOLOY 800-H (containing by weight 20% chromium and 32% nickel), which is an alloy commonly used in steam cracking. Tube B is made from an alloy having the following percentages by weight:

| Ni | 74.653% | Cr | 16.34% |
|----|---------|----|--------|
| Al | 4.54%   | Fe | 3.68%  |
| Mn | 0.2%    | Mo | 0.1%   |
| W  | 0.1%    | Ti | 0.1%   |
| Si | 0.1%    | Cd | 0.05%  |
| Co | 0.05%   | C  | 0.04%  |
| Zr | 0.03%   | P  | 0.005% |
| Y  | 0.004%  | B  | 0.004% |
| S  | 0.002%  | Mg | 0.002% |

The pretreatment is carried out by contacting the tube for 60 minutes at 1095° C. and under hydrogen with a residual air content, such that the dew point is −50° C.

Tubes C and D are obtained from the tube B, pretreated in the manner described hereinbefore and adopting the following procedure.

In the case of the tube C, an alumina deposition takes place by impregnating with a slop. This slop suspension is constituted by 75% by weight alumina (with a specific surface equal to 2 $m^2xg^{-1}$), 25% by weight boehmite serving as the binder and 30% by weight water, expressed relative to the solid weight. This suspension undergoes a grinding operation under conditions making it possible to obtain a product, which filters entirely through a screen having $10^{-5}$ m openings. The tube is immersed in the ground slop and kept in contact for 2 minutes. The tube is then removed and the excess slop is allowed to flow away at ambient temperature for 5 minutes. The tube then undergoes a heat treatment during which its temperature is raised to 1050° C. and it is kept at this temperature for 5 hours. After cooling to ambient temperature, it is found that the thus obtained alumina layer has a thickness of $5 \times 10^{-5}$ m.

In the case of the tube D, titanium carbide is deposited by chemical vapor deposition (CVD). This deposit is obtained in conventional manner by reduction with titanium tetrachloride hydrogen in the presence of methane, while maintaining the tube to be coated at 1000° C., which gives a $10^{-5}$ m thick coating.

The following table compares the efficiency levels obtained for naphtha with the maximum skin temperature compatible with the materials used and also gives the cracked charge characteristics.

In the case of the pretreated or not pretreated tube B, apart from the increase in the olefin selectivity (gain of almost 5 points on the total $C_2+C_3$) linked with the increase in the mean reaction temperature, there is also a lower coke deposition rate observed for a tube pretreated under hydrogen under the conditions described hereinbefore and despite the higher skin temperature. In the case where there is no pretreatment, the coating rate is multiplied by a factor of 4 under the test conditions. The other experimental results are unchanged compared with the case when the tube B is pretreated. The lower coke deposition rate in the case of tubes C and D compared with that obtained with the pretreated tube B should also be noted.

TABLE 1

|  | Tube A | Tube B pretreated under $H_2$ | Not pretreated Tube B | Tube A | Tube C | Tube D |
|---|---|---|---|---|---|---|
| DIMENSIONS (mm) | | | | | | |
| Cross-section | 8 × 10 | 8 × 10 | 8 × 10 | 8 × 10 | 8 × 10 | 8 × 10 |
| Length | 1000 | 1000 | 1000 | 1000 | 1000 | 1000 |
| MATERIAL | Incoloy 800 H | 74.653% nickel super alloy | 74.653% nickel super alloy | Incoloy 800 H | 74.653% nickel super alloy | 74.653% nickel super alloy |
| OPERATING CONDITIONS | | | | | | |
| *Flow rates* | | | | | | |
| Naphtha flow (kg/h) | 8 | 8 | 8 | 8 | 8 | 8 |
| Water flow (kg/h) | 4.8 | 4.8 | 4.8 | 4.8 | 4.8 | 4.8 |
| *Naphtha temperatures* | | | | | | |
| Inlet (°C.) | 600 | 600 | 600 | 600 | 600 | 600 |
| Outlet (°C.) | 933 | 985 | 985 | 933 | 985 | 985 |
| *Naphtha pressure* | | | | | | |
| Inlet (MPa absolute) | 0.197 | 0.205 | 0.205 | 0.197 | 0.205 | 0.205 |
| Outlet (MPa absolute) | 0.150 | 0.150 | 0.150 | 0.150 | 0.150 | 0.150 |
| Residence time (ms) | 93 | 85 | 85 | 93 | 85 | 85 |
| NAPHTHA CHARACTERISTICS | | | | | | |
| Density (15° C.) | | 0.681 | | | 0.681 | |
| *ASTM* | | | | | | |
| Starting point (°C.) | | 36 | | | 36 | |
| End point (°C.) | | 184 | | | 184 | |
| COMPOSITION (wt %) | | | | | | |
| % N paraffins | | 42.12 | | | 42.12 | |
| % Isoparaffins | | 37.66 | | | 37.66 | |
| % Naphthenes | | 14.44 | | | 14.44 | |
| % Aromatics | | 5.38 | | | 5.38 | |
| YIELDS (wt %) | | | | | | |
| Fuel gas ($CH_4 + H_2$) | 14.2 | 13.5 | 13.5 | 14.2 | 13.5 | 13.5 |
| $C_2$ fraction | 33.3 | 38.8 | 38.8 | 33.3 | 38.8 | 38.8 |
| $C_3$ fraction | 17.6 | 16.5 | 16.5 | 17.6 | 16.5 | 16.5 |
| $C_4$ fraction | 13.9 | 11 | 11 | 13.9 | 11 | 11 |
| ($C_5$-$C_{11}$) petrol | 18 | 17 | 17 | 18 | 17 | 17 |
| Residual fuel oil ($C_{12}+$) | 3.0 | 3.2 | 3.2 | 3.0 | 3.2 | 3.2 |
| Max skin temperature (°C.) | 1054 | 1198 | 1198 | 1054 | 1198 | 1198 |
| Coking speed ($g \times h^{-1} \times m^{-2}$) | 63 | 20 | 82 | 63 | 16 | 18 |

We claim:

1. In a process for the thermal cracking of a charge containing at least one hydrocarbon having at least one carbon atom, wherein, under thermal cracking conditions, said charge is passed through a metallic reaction zone having an inner wall exposed to an overall reducing atmosphere and having an outer wall in indirect heat exchange relationship with a heating fluid, said outer wall being exposed to an oxidizing atmosphere, the improvement wherein the metallic reaction zone consists essentially of an alloy comprising 66% to 82% nickel, 14% to 18% chromium and 4% to 6% aluminum.

2. A process according to claim 1, wherein the alloy comprises by weight 66 to 81.999% nickel, 14 to 18% chromium, 4 to 6% aluminum, and 0.001 to 8% iron.

3. A process according to claim 1, wherein the alloy also comprises a finite quantity of at least one of 0 to 0.25% carbon, 0 to 0.03% boron, 0 to 5% tungsten, 0 to 2.5% tantalum, 0 to 5% titanium, 0 to 0.5% hafnium, 0 to 0.25% zirconium, 0 to 0.2% rhenium, 0 to 12% cobalt, 0 to 1% manganese, 0 to 3% molybdenum, 0 to 1% silicon, 0 to 1.5% yttrium, 0 to 0.2% cadmium, 0 to 0.05% sulfur and 0 to 0.05% phosphorus.

4. A process according to claim 1, wherein the temperature of at least part of the outer wall of the reaction zone is 1190° C. to 1250° C.

5. A process according to claim 1, wherein the pyrolysis reaction zone A is a zone incorporating a plurality of channels constituting a first group of channels D and a second group of channels F, each channel D of the first group being positioned adjacent to at least one channel F of the second group, the channels of the first group in which a reaction mixture is made to flow extending along the entire zone A and having an inlet 1 and an outlet 11, respectively, at the start and finish of said zone, the second group of channels F defining a heating zone in which the reaction mixture flowing through the channels of the first group is heated by indirect heat exchange with a heating fluid flowing in the second group of channels, the channels of the second group F having an inlet 2, preferably located at a distance from the start of said group F channels, representing 5% to 95% of their total length and the channels of the second group F also having either an outlet 3 at the start of said group F channels or an outlet 4 at the end thereof or an outlet 3 and an outlet 4, respectively, at the start and finish thereof.

6. A process according to claim 5, wherein the reaction zone comprises two continuous zones A and B, where the channels of the second group are subdivided into a first section F and a second section F', said two sections being successive, non-communicating sections separated by an intermediate partition J, the first section being the heating or pyrolysis zone A, the second section defining a quenching zone B contiguous to the zone A, in which the thermally cracked reaction mixture circulating in the channels of the first group is cooled by indirect exchange with a cooling fluid circulating through the second section F' of the channels of the second group, the first section F having an inlet 2 and either a first outlet 3 at the start of said section, or a second outlet 4 in the vicinity of the intermediate partition J, or both the first and second outlets 3 and 4, while the second section F' has an inlet 6 in the vicinity of the intermediate partition and an outlet 7 at the end of the second section, and wherein the reaction mixture is pyrolyzed in part of the channels D of the first group adjacent to the first section F of the channels of the second group and subsequently the pyrolyzed mixture is subject to indirect quenching conditions in a part of the channels of the first group adjacent to the second section F' of the channels of the second group.

7. A process according to claim 1, wherein the reaction zone comprises an inner wall in contact with a reaction mixture and wherein a preoxidation stage has been carried out, in which the inner and outer walls of the reaction zone are contacted, at a temperature of between 1050° C. and 1250° C. for 1 to 120 minutes, with a gaseous mixture incorporating mostly hydrogen with a minor amount of oxygen, said gaseous mixture having a dew point below −34° C. so as to selectively form aluminum oxide and only small amounts of chromium oxide and nickel oxide.

8. A process according to claim 7, wherein the walls of the reaction zone are coated with at least one coating selected from the group consisting of an oxide of at least one metal, at least one metal carbide, at least one metal nitride, and at least one metal silicide.

9. A process according to claim 8, wherein the coating is selected from the group consisting of at least one oxide of a metal chosen from within the group formed by aluminum, zirconium, yttrium, cerium, silicon and titanium, at least one carbide of at least one metal selected from the group consisting of silicon, titanium, zirconium and boron, at least one nitride of at least one metal selected from the group consisting of boron, titanium and zirconium, and at least one silicide of at least one metal selected from the group consisting of titanium, zirconium and niobium.

10. A process according to claim 8, wherein the coating has a thickness of approximately $2 \times 10^{-6}$ to approximately $10^{-3}$ meter.

11. A process according to claim 8, wherein the coating is deposited by impregnation or plasma-assisted or plasma-non-assisted chemical vapor deposition, or by plasma-assisted or plasma-non-assisted spraying.

12. A process according to claim 8, wherein the coating incorporates a catalyst.

13. In a reactor for performing thermal cracking, the improvement wherein the reactor consists essentially of an alloy constituted by 66 to 82% nickel, 14 to 18% chromium and 4 to 6% aluminum.

14. A reactor according to claim 13, wherein the alloy, at least in the reaction zone, is coated with at least one coating selected from the group consisting of an oxide of at least one metal, at least one metal carbide, at least one metal nitride, and at least one metal silicide.

15. A reactor according to claim 13 which is a steam cracking reactor.

16. A reactor according to claim 13 which is a thermal dehydrogenation reactor.

17. A process according to claim 1, wherein the alloy comprises 71–78.9% nickel, 15–17% chromium, 4.1–5.1% aluminum, and 1–6% iron.

18. A process according to claim 8, wherein the alloy comprises 71–78.9% nickel, 15–17% chromium, 4.1–5.1% aluminum, and 1–6% iron.

19. A process according to claim 9, wherein the alloy comprises 71–78.9% nickel, 15–17% chromium, 4.1–5.1% aluminum, and 1–6% iron.

20. A process according to claim 19, wherein the coating has a thickness of approximately $2 \times 10^{-6}$ to approximately $10^{-3}$ meter.

* * * * *

UNITED STATES PATENT AND TRADEMARK OFFICE
CERTIFICATE OF CORRECTION

PATENT NO. : 5,242,574

DATED : September 7, 1993

INVENTOR(S) : Paul BROUTIN et al.

It is certified that error appears in the above-identified patent and that said Letters Patent is hereby corrected as shown below:

Claim 1; Col. 10; Line 44:

Delete "indirect" Insert - - direct - -

Signed and Sealed this

Nineteenth Day of April, 1994

*Attest:*

BRUCE LEHMAN

*Attesting Officer*     *Commissioner of Patents and Trademarks*